Figure 1:
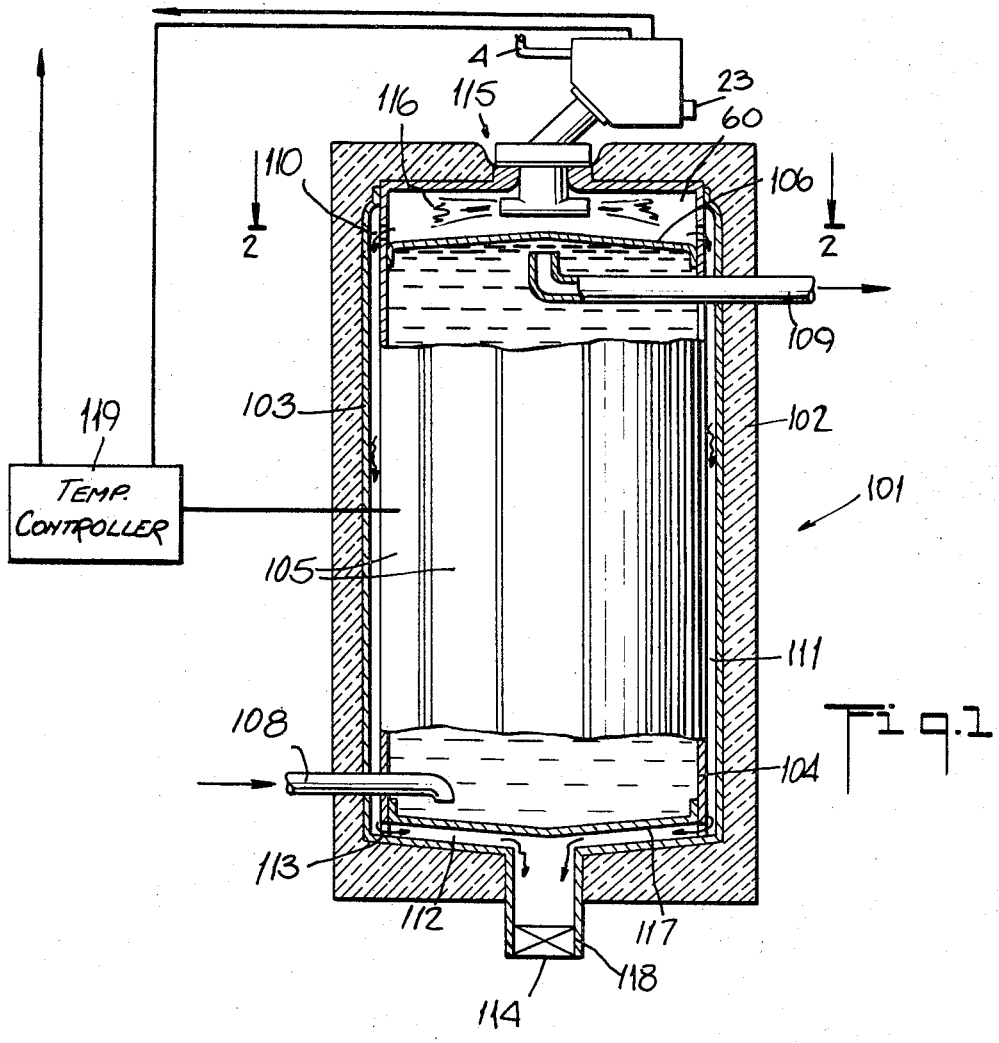

United States Patent

[11] 3,526,211

[72] Inventor Ronald D. Corey
R.D. 1, Chenango Forks, New York 13746
[21] Appl. No. 748,729
[22] Filed July 30, 1968
[45] Patented Sept. 1, 1970

[54] DIRECT FIRE HEATING DEVICE
7 Claims, 2 Drawing Figs.
[52] U.S. Cl. .................................................. 122/14,
122/234, 122/494
[51] Int. Cl. .................................................. F22b 5/00
[50] Field of Search .......................................... 122/14, 23,
149, 233, 234, 494

[56] References Cited
UNITED STATES PATENTS
| | | | |
|---|---|---|---|
| 1,774,552 | 9/1930 | Hawley, Jr. .................. | 122/234X |
| 1,964,306 | 6/1934 | Wenger ....................... | 122/23 |
| 1,983,386 | 12/1934 | Mikeska ...................... | 122/23 |
| 3,329,131 | 7/1967 | Wright ........................ | 122/149 |

Primary Examiner—Kenneth W. Sprague
Attorney—Norman N. Holland

ABSTRACT: A heating system is now provided comprising the disposition of the heat source above the reservoir of fluid to be heated, which reservoir is contained within a spaced insulated casing from which the hot fluid is evacuated by a reduced pressure produced at the bottom of the system thereby producing a counterflow between the hot and heated fluids. In the preferred embodiment the fluid to be heated such as water is contained in a reservoir or tank having an inlet at the bottom and an outlet at the top. This tank is contained within a hollow insulated chamber at sub-atmospheric pressure having a sealed burner unit disposed at its top and an exhaust outlet at its bottom through which the heated gases from the burner are evacuated by the production of an induced draft. This arrangement produces a counterflow effect between the downwardly drawn heated gases and the rising water being heated within the tank resulting in a more efficient heat exchange system insensitive to ambient conditions and capable of more rapid heating. Valve control of the induced draft permits temperature control of the residual exhaust gases.

Patented Sept. 1, 1970

3,526,211

INVENTOR.
RONALD D. COREY
BY
ATTORNEY

DIRECT FIRE HEATING DEVICE

It is common practice to equip direct-fired heating systems with an atmospheric burner device which utilizes an open flame for heating a fluid to be circulated such as water in a water heater. The performance of such open flame devices is subject to variations in ambient termperatures and to air currents or draft conditions which may lower the efficiency of these devices with considered waste of fuel. Also, in such atmospheric combustion devices the temperature of the exhaust gases is generally quite high resulting in a further waste of heat. Furthermore, the combustion gases within the heat exchanger apparatus are vented during idle periods causing internal heat losses which further increase operating costs. Along with these problems another objection to these presently used heating systems is that the flame is at the bottom of the liquid holding tank and a substantial part of the reserve of liquid must be heated or withdrawn before the heated liquid is available for use. This results in additional waste.

The present invention permits residual combusted gas flow downstream during heating periods and thereafter stops the flow of residual gases during idle periods thus reducing internal stand-by heat losses irrespective of vacuum presence. Also high efficiency is obtained by controlled flow speed of the residual hot gases within the heat exchanger during burning periods to permit more complete heat transfer to the product being heated. Also the counter flow downward direction of the moving hot gases permits faster heat absorption because of greater temperature differential as the exhaust exit is located at the cold end of the heating device and thus achieves efficiencies in the vicinity of 90 percent.

The burner is small and compact in design and obviates the use of complicated electrical circuitry, by virtue of the use of sequenced mechanical fuel-mixing control valves.

The present invention also uses a heating system which is sealed and insulated from the ambient atmosphere and is operated by the use of an induced draft. Fine temperature control and improved efficiency is achieved through control of the induced draft and in addition a counterflow of hot and heated fluids is used which contributes to the improved heat exchange efficiency.

It is an object of the present invention to provide a heating apparatus of increased operating efficiency which conserves fuel by reducing internal stand-by heat losses, requires no pilot flame and permits greater heat transfer from the residual combusted gases to the fluid to be heated.

It is another object of the present invention to provide a direct-fired heating system which is not subject to variations in the ambient atmosphere.

Another of its objectives is the provision of a heating device whereby a large part of the residual heat remaining in the exhaust gases is recovered within the heat exchange mechanism.

Another object of the present invention is the provision of a heating device wherein residual combustion gases are retained within the exchanger during idle periods to eliminate internal stand-by heat losses.

Another object of the present invention is the provision of a heating mechanism whereby the loss of heat of the combustion gases is decreased substantially.

A further object of this invention is to provide a heating device wherein the hot combusted gases flow in a counter direction from conventional atmospheric heating apparatus to avoid loss of heat.

Another object of this invention is to provide proper venting and to permit automatic drainage of any condensation occurring in the heat passages.

A further object of this invention is to provide an exhaust temperature limiter responsive to temperatures in the heat passages which will partially close the vent opening of the system and thus recede the degree of vacuum or induced draft within the combustion heat exchanger to cause the combination control device to modulate the fuel input downward and slow the flow speed of the residual exhaust gases to achieve greater heat transfer from them to the fluid being heated.

Other and further objects of the invention will be obvious upon an understanding of the illustrative embodiment about to be described, or will be indicated in the appended claims, and various advantages not referred to herein will occur to one skilled in the art upon employment of the invention in practice.

Figure 2:
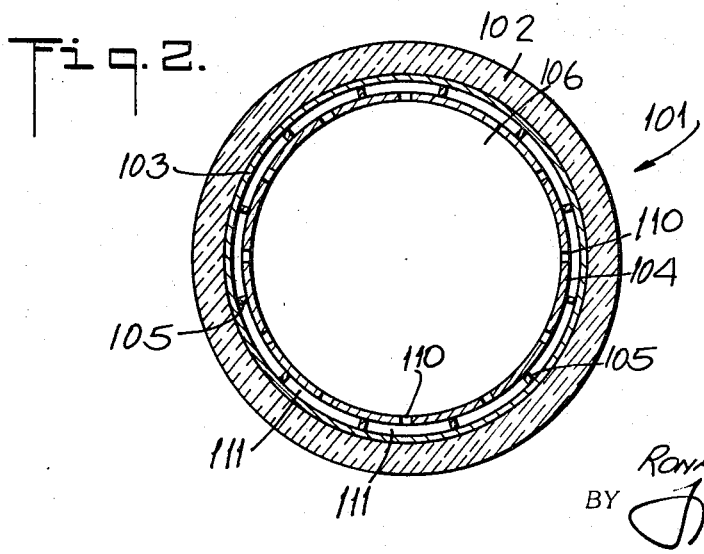

A preferred embodiment of the invention has been chosen for purposes of illustration and description and is shown in the accompanying drawings, forming a part of the specification wherein:

FIG. 1 is a sectional view in elevation showing a preferred embodiment of the present invention; and FIG. 2 is a sectional view taken along line 2—2 of FIG. 1.

Referring to FIGS. 1 and 2 of the drawings, the direct fire heating device comprises an outer jacket 102 provided for the system which may be made of ceramic or any other well known insulating material. An inner casing 103 is provided adjacent the outer casing 102 and a water container 104 is mounted within the inner casing 103 and spaced therefrom by a plurality of supporting fins 105. The water casing 104 has a top wall 106 spaced from the top of the outer casing 102 and a bottom wall 107 spaced from the bottom of the inner casing 103. A water supply pipe 108 extends in at the bottom of the tank 104 and a hot water outlet port 109 extends from the upper portion thereof. A plurality of openings 110 is provided in the inner casing 104 which communicate with the passages 111 formed by the fins 105. A second series of fins 112 and openings 113 are provided at the lower end of the apparatus in order to communicate the passages 111 with the vent 114 at the bottom.

A combustion control-burner device 115 of the negative pressure or induced draft type is mounted above the inner casing 104 and comprises a burner chamber 60 wherein combustible gas is burned in close proximity with the top wall 106. An induced draft is produced at the bottom vent 114 which causes the hot gases 116 to escape through the top vents 110 and descend along passages 111. The water or fluid being heated by the combusted gases move upwardly within tank 104 when the said heated fluid is being withdrawn through the exit 109 of said tank. It will be seen that the fluid being heated by the hot gases moves counterdirectional to the heating gases, thus achieving faster heat exchange due to greater temperature differential. The progressive heating of the cool fluid is being achieved by the remaining temperature in the residual gases, thereby utilizing heat that is normally wasted through the stack of conventional atmospheric heating apparatus. The fluid being heated within the tank 104 may flow toward the heat generating source while the residual hot gases flow toward the cold inlet 108 of the tank. The cooler exhaust gases 116 are then ejected through the vent 114. The bottom vent 114 also permits automatic drainage of any condensation which may occur within passages 111.

The vent 114 may be equipped with an exhaust temperature sensing valve 118, designed to regulate the level of induced draft within said combustion chamber 60 or passages 111, in relation to the remaining temperature of the exhaust gases (cool gases permit full vacuum, warmer gases recede the vacuum within the said chambers). The control-burner device 115, being capable of increasing and/or decreasing the gas-input in response to the level of vacuum therein, regulates the combustion input in relation with the temperature of the exhaust being withdrawn through the vent 114 of the heating apparatus. Thus one will see that combustion input can be increased or decreased in speed, to match the temperature recovery requirements to maintain temperature of the fluid as it is being withdrawn from the tank exit 109.

A thermostatic device 119 may be provided which will respond to a drop in temperature of the fluid being heated, said drop in temperature will cause a normally open switch to close a circuit through the electrical system that will energize the fuel supply valve and ignition system, thereby induce combustion within combustion chamber 60 in close proximity to the heated fluid outlet 109, thereby heat generation is set in motion.

It will thus be seen that with the present invention it is not necessary as in the prior art devices which apply combustion at the bottom of the tank, to wait for the fluid being heated to become hot from the bottom to the top of the tank, thus much faster heat recovery can be achieved, a speed approximating the speed of withdrawal from the tank, with sacrificing the amount of fuel wasted by conventional fast recovery heaters.

It will be seen also that the present invention provides an improved direct fired heating apparatus with greatly increased efficiency due to retaining the residual combusted gases within the passages 111, and 62 during idle periods, thus permitting the remaining temperature in the combusted gases to be absorbed by the fluid being heated within tank 104, also, by the closing of all ingress valves within the combustion control 115 during idle periods, all evacuation of residual gases is thereby stopped and thus preventing atmospheric air currents from passing therethrough even though vacuum remains present, thereby, internal standby heat losses are reduced far below the heat losses from prior art atmospheric heating apparatus.

By way of summary, the overall operation of a fluid heating system will be described. With the fluid reservoir filled with fluid to be heated and a combustion control-burner device in operating condition, is shown in FIG. 1. Any thermostat or other starting device, may be used to initiate operation of the apparatus. The combustible gas mixer and electric ignition and control system can be contained in the housing 115, whereby combustion is initiated within combustion chamber 60. When a drop in temperature is sensed by the thermostat in the fluid being heated, it will institute combustion and stop combustion when the pre-set temperature is re-established in the fluid being heated. The combustion control-burner device may be located in close proximity to the reservoir exit 109, also the vent may be located near the cold fluid inlet 108 thus providing counterdirectional flow of the heating gases as opposed to the flow of the fluid being heated. The counterflow feature of the residual heating gases into the vicinity of the cool fluid being heated, can thereby exchange a larger amount of their remaining temperature to the fluid than is possible within heating apparatus whose vent is located at the high temperature end of the reservoir. An exhaust temperature sensing, expanding and retracting valve mechanism may be located in the exhaust vent 114. This sensing valve mechanism will contract in response to cool temperature and expand in response to hot residual gases, thereby, controlling the level of subatmospheric pressure within the combustion and flue chambers, which is thereby relayed to the diaphragm valves within control 115 which in turn modulates the combustion input in relation to the heat exchanged to the fluid thus keying the heating speed to the amount of fluid being withdrawn from the apparatus.

The modulating feature of the control device can thereby assure low temperature of the spent gases which can be 150°F or less.

During the idle period, the residual exhaust gases are trapped within the combustion and flue chamber 60 and 111 by the closing of the control's air ingress valve, thus preventing movement of the combusted gases and/or air through said passages irrespective of vacuum presence therein. This stoppage of the movement through the passages greatly reduce standby heat losses from the heated fluid. Likewise by opening the control's air ingress valve, movement is re-established which induces the combustible gas mixture whereby combustion is instituted.

The exhaust vent, being located at the bottom of the reservoir 103 permits automatic drainage of any condensation which may form as a result of the exhaust gases being cooled below the due point. The condensation is thereby drained into the exhaust pipe system 114 which is equipped with liquid removal traps located at every low point in the exhaust system for removal of all condensation to a sewer or suitable drain.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. A heating system comprising a first chamber having an inlet at the bottom and an outlet at the top and containing a fluid to be heated, a second chamber in heat exchange relationship with said first chamber having an inlet at the top and an outlet at the bottom and communicating with a heated fluid, means producing a reduced pressure at the outlet of said second chamber to draw the heated fluid downwardly therethrough, fluid heating means located above said first chamber, said heating means being a burner positioned at the top of said second chamber, said burner being of the sealed type, said burner and said first and said second chambers being contained within an insulated casing and a high temperature limiting valve positioned in the outlet of said second chamber.

2. A system as claimed in claim 1 wherein said valve varies the level of the induced draft.

3. A system as claimed in claim 2 wherein said first chamber is contained in said second chamber.

4. A system as claimed in claim 3 wherein said first chamber is supported within said second chamber by spacing fins.

5. A heat exchanging system comprising a tank for containing the fluid to be heated with an inlet at the bottom and an outlet at the top, a housing surrounding said tank, a plurality of fins supporting said tank in said housing in spaced relationship, a sealed burner at the top of said housing, means for producing an induced draft at the bottom of said housing for drawing the exhaust gases from said burner downwardly in heat exchange relationship through the spaces between said tank and said housing, an insulating casing at the outside of said housing and valve means for controlling the induced draft.

6. A fluid heating system as claimed in claim 5 wherein a combustion control system equipped with an air ingress valve means is provided which is adapted to permit inward flow of the heating gases downstream towards the vent during heating periods, and thereafter stop movement of said heating gases during idle periods with maintaining the vacuum present in said spaces between said housing and said tank.

7. A fluid heating system as claimed in claim 6 wherein the vent from the apparatus is located at the bottom of the housing whereby automatic drainage of such condensation as may form from the exhaust gases being cooled below the due point to the vacuum exhaust system which is equipped with liquid removal traps at every low point within the piping system, for removal of such condensation.